US008643701B2

(12) United States Patent
Nguyen et al.

(10) Patent No.: US 8,643,701 B2
(45) Date of Patent: Feb. 4, 2014

(54) SYSTEM FOR EXECUTING 3D PROPAGATION FOR DEPTH IMAGE-BASED RENDERING

(75) Inventors: Quang Huu Nguyen, Ho Chi Minh (VN); Minh Ngoc Do, Champaign, IL (US); Sanjay Jeram Patel, Urbana, IL (US)

(73) Assignee: University of Illinois at Urbana-Champaign, Urbana, IL (US)

( * ) Notice: Subject to any disclaimer, the term of this patent is extended or adjusted under 35 U.S.C. 154(b) by 439 days.

(21) Appl. No.: 12/948,373

(22) Filed: Nov. 17, 2010

(65) Prior Publication Data

US 2011/0115886 A1     May 19, 2011

Related U.S. Application Data

(60) Provisional application No. 61/262,451, filed on Nov. 18, 2009.

(51) Int. Cl.
  *H04N 13/02* (2006.01)
  *G06K 9/00* (2006.01)
  *G06K 9/32* (2006.01)

(52) U.S. Cl.
  USPC .............................. 348/47; 382/154; 382/294

(58) Field of Classification Search
  None
  See application file for complete search history.

(56) References Cited

U.S. PATENT DOCUMENTS

| | | |
|---|---|---|
| 5,043,922 A | 8/1991 | Matsumoto |
| 5,239,624 A | 8/1993 | Cook et al. |
| 5,363,475 A | 11/1994 | Baker et al. |
| 5,377,313 A | 12/1994 | Scheibl |
| 5,392,385 A | 2/1995 | Evangelisti et al. |
| 5,561,752 A | 10/1996 | Jevans |
| 5,563,989 A | 10/1996 | Billyard |
| 5,586,234 A | 12/1996 | Sakuraba et al. |
| 5,600,763 A | 2/1997 | Greene et al. |
| 5,651,104 A | 7/1997 | Cosman |
| 5,742,749 A | 4/1998 | Foran et al. |
| 5,870,097 A | 2/1999 | Snyder et al. |
| 5,914,721 A | 6/1999 | Lim |

(Continued)

OTHER PUBLICATIONS

Akbarzadeh, A., et al., "Towards Urban 3D Reconstruction From Video," Third International Symposium on 3D Data Processing, Visualization, and Transmission, pp. 1-8 (Jun. 14-16, 2006).

(Continued)

*Primary Examiner* — Joseph Ustaris
*Assistant Examiner* — Ellyar Y Barazesh
(74) *Attorney, Agent, or Firm* — Law Offices of John Stattler, PC

(57) ABSTRACT

A system is disclosed for executing depth image-based rendering of a 3D image by a computer having a processor and that is coupled with one or more color cameras and at least one depth camera. The color cameras and the depth camera are positionable at different arbitrary locations relative to a scene to be rendered. In some examples, the depth camera is a low resolution camera and the color cameras are high resolution. The processor is programmed to propagate depth information from the depth camera to an image plane of each color camera to produce a propagated depth image at each respective color camera, to enhance the propagated depth image at each color camera with the color and propagated depth information thereof to produce corresponding enhanced depth images, and to render a complete, viewable image from one or more enhanced depth images from the color cameras. The processor may be a graphics processing unit.

7 Claims, 11 Drawing Sheets

(56) References Cited

U.S. PATENT DOCUMENTS

| | | | |
|---|---|---|---|
| 6,016,150 | A | 1/2000 | Lengyel et al. |
| 6,057,847 | A | 5/2000 | Jenkins |
| 6,072,496 | A | 6/2000 | Guenter et al. |
| 6,084,979 | A | 7/2000 | Kanade et al. |
| 6,111,582 | A | 8/2000 | Jenkins |
| 6,424,351 | B1* | 7/2002 | Bishop et al. ............... 345/582 |
| 6,445,815 | B1* | 9/2002 | Sato ............................ 382/154 |
| 6,771,303 | B2 | 8/2004 | Zhang et al. |
| 7,221,366 | B2 | 5/2007 | Uyttendaele et al. |
| 7,471,292 | B2 | 12/2008 | Li |
| 7,532,230 | B2 | 5/2009 | Culbertson et al. |
| 2002/0061131 | A1* | 5/2002 | Sawhney et al. ............. 382/154 |
| 2003/0214502 | A1 | 11/2003 | Park et al. |
| 2003/0231179 | A1 | 12/2003 | Suzuki |
| 2006/0072851 | A1* | 4/2006 | Kang et al. ................... 382/294 |
| 2009/0016640 | A1 | 1/2009 | Klein Gunnewiek |
| 2009/0115780 | A1 | 5/2009 | Varekamp et al. |
| 2009/0129667 | A1* | 5/2009 | Ho et al. ....................... 382/154 |
| 2009/0171999 | A1* | 7/2009 | McColl et al. ................ 707/101 |
| 2010/0215251 | A1* | 8/2010 | Klein Gunnewiek et al. ............................ 382/154 |
| 2010/0238160 | A1* | 9/2010 | Yea et al. ...................... 345/419 |
| 2010/0309292 | A1* | 12/2010 | Ho et al. ......................... 348/47 |
| 2011/0211045 | A1* | 9/2011 | Bollano et al. .................. 348/46 |

OTHER PUBLICATIONS

Barnat, Jiří, et al., "CUDA accelerated LTL Model Checking," FI MU Report Series, FIMU-RS-2009-05, 20 pages (Jun. 2009).

Canesta™, "See How Canesta's Solution Gesture Control Will Change the Living Room," retrieved Oct. 21, 2010, from http://canesta.com, 2 pages.

Chan, S.C., et al., "Image-Based Rendering and Synthesis," IEEE Signal Processing Magazine, pp. 22-31 (Nov. 2007).

Chan, Shing-Chow, et al. "The Plenoptic Video," 15(12) IEEE Transactions on Circuits and Systems for Video Technology 1650-1659 (Dec. 2005).

Chen, Wan-Yu, et al., "Efficient Depth Image Based Rendering with Edge Dependent Depth Filter and Interpolation," IEEE International Conference on Multimedia and Expo, pp. 1314-1317 (Jul. 6, 2005).

Daribo, Ismaël, et al., "Distance Dependent Depth Filtering in 3D Warping for 3DTV," IEEE 9th Workshop on Multimedia Signal Processing, pp. 312-315 (2007).

Debevec, Paul, et al., "Efficient View-Dependent Image-Based Rendering with Projective Texture-Mapping," In 9th Eurographics Workshop on Rendering, pp. 105-116 (Jun. 1998).

Diebel, James, et al., "An Application of Markov Random Fields to Range Sensing," In Advances in Neural Information Processing Systems, pp. 291-298 (2006).

Fehn, Christoph, "Depth-Image-Based Rendering (DIBR), Compression and Transmission for a New Approach on 3D-TV," Proc. SPIE 5291, 93-104 (2004).

Fehn, Christoph, et al., "Interactive 3-DTV—Concepts and Key Technologies," 94(3) Proceedings of the IEEE 524-538 (Mar. 2006).

GPGPU (General-purpose computing on graphics processing units)—Wikipedia, retrieved Nov. 17, 2009, from http://en.wikipedia.org/wiki/GPGPU, 9 pages.

Ho, Yo-Sung, et al., "Three-dimensional Video Generation for Realistic Broadcasting Services," ITC-CSCC, pp. TR-1 through TR4 (2008).

Jung, KwangHee, et al., "Depth Image Based Rendering for 3D Data Service Over T-DMB," IEEE, 3DTV-CON'08, Istanbul, Turkey, pp. 237-240 (May 28-30, 2008).

Kanade, Takeo, et al., "Virtualized Reality: Constructing Virtual Worlds from Real Scenes," IEEE MultiMedia, pp. 34-46 (Jan.-Mar. 1997).

Kao, Wen-Chung, et al., "Multistage Bilateral Noise Filtering and Edge Detection for Color Image Enhancement," 51(4) IEEE Transactions on Consumer Electronics 1346-1351 (Nov. 2005).

Kipfer, Peter, "GPU Gems 3—Chapter 33. LCP Algorithms for Collision Detection Using CUDA," retrieved Nov. 17, 2009, from http://http.developer.nvidia.com/GPUGems3/gpugems3_ch33.html, 11 pages (2007).

Kubota, Akira, et al., "Multiview Imaging and 3DTV," IEEE Signal Processing Magazine, pp. 10-21 (Nov. 2007).

Lee, Eun-Kyung, et al., "High-Resolution Depth Map Generation by Applying Stereo Matching Based on Initial Depth Information," 3DTV-CON'08, Istanbul, Turkey, pp. 201-204 (May 28-30, 2008).

Mark, William R., et al., "Post-Rendering 3D Warping," In Proceedings of 1997 Symposium on Interactive 3D Graphics, Providence, RI, pp. 7-16 (Apr. 27-30, 1997).

McMillan, Jr., Leonard, "An Image-Based Approach to Three-Dimensional Computer Graphics," University of North Carolina at Chapel Hill, Chapel Hill, NC, 206 pages (1997).

Nguyen, Ha T., et al., "Image-Based Rendering with Depth Information Using the Propagation Algorithm," Proc. of IEEE International Conference on Acoustics, Speech, and Signal Processing (ICASSP), 4 pages (Mar. 2005).

Nguyen, Quang H., et al., "Depth image-based rendering from multiple cameras with 3D propagation algorithm," Proceedings of the 2nd International Conference on Immersive Telecommunications, 6 pages (2009).

Nguyen, Quang H., et al., "Depth Image-Based Rendering with Low Resolution Depth," 16th IEEE International Conference on Image Processing (ICIP), pp. 553-556 (2009).

PrimeSense, Home Page, retrieved Oct. 21, 2010, from http://www.primesense.com, 1 page.

Saxena, Ashutosh, et al., "3-D Depth Reconstruction from a Single Still Image," 76(1) International Journal of Computer Vision 53-69 (2007).

Shade, Jonathan, et al., "Layered Depth Images," Computer Graphics Proceedings, Annual Conference Series, pp. 231-242 (Jul. 19-24, 1998).

Shum, Heung-Yeung, et al., "A Review of Image-based Rendering Techniques," IEEE/SPIE Visual Communications and Image Processing (VCIP), pp. 1-12 (Jun. 2000).

Tomasi, C., et al., "Bilateral Filtering for Gray and Color Images," Sixth International Conference on Computer Vision, pp. 839-846 (1998).

Um, Gi-Mun, et al., "Three-dimensional Scene Reconstruction Using Multi-view Images and Depth Camera," SPIE-IS&T/ vol. 5664, pp. 271-280 (2005).

Vázquez, C., et al., "3D-TV: Coding of Disocclusions for 2D+Depth Representation of Multi-View Images," Proceedings of the Tenth IASTED Int'l Conference: Computer Graphics and Imaging, pp. 26-33 (Feb. 13-15, 2008).

Yang, Qingxiong, et al., "Spatial-Depth Super Resolution for Range Images," IEEE Conference on Computer Vision and Pattern Recognition, pp. 1-8 (2007).

Zhang, Buyue, et al., "Adaptive Bilateral Filter for Sharpness Enhancement and Noise Removal," IEEE ICIP, pp. IV-417-IV-420 (2007).

Zhang, Cha, et al., "A Survey on Image-Based Rendering—Representation, Sampling and Compression," Technical Report AMP 03-03, Electrical and Computer Engineering, Carnegie Mellon University, Pittsburgh, PA, pp. 1-45 (Jun. 2003).

Zitnick, C. Lawrence, et al., "High-quality video view interpolation using a layered representation," 23(3) Journal ACM Transactions on Graphics (TOG)—Proceedings of ACM SIGGRAPH 2004, pp. 600-608 (Aug. 2004).

\* cited by examiner

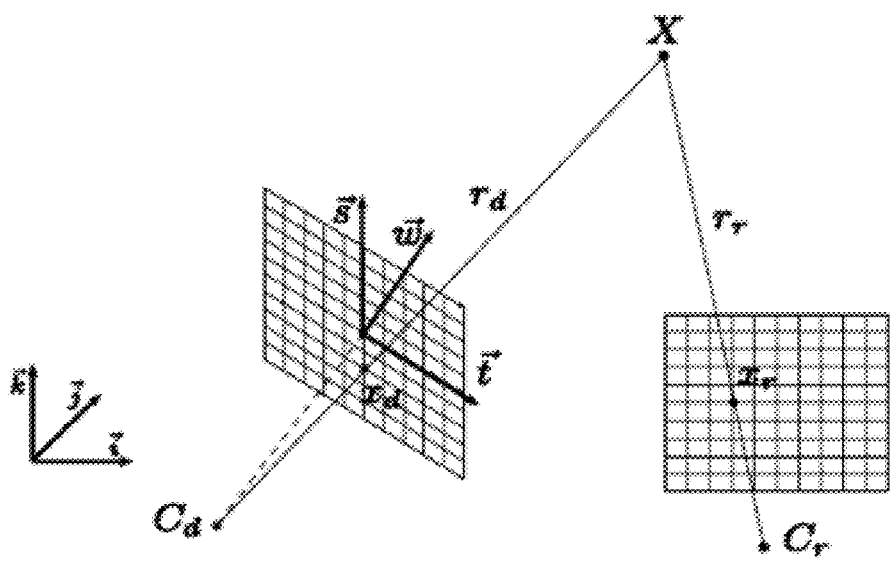
FIG. 5
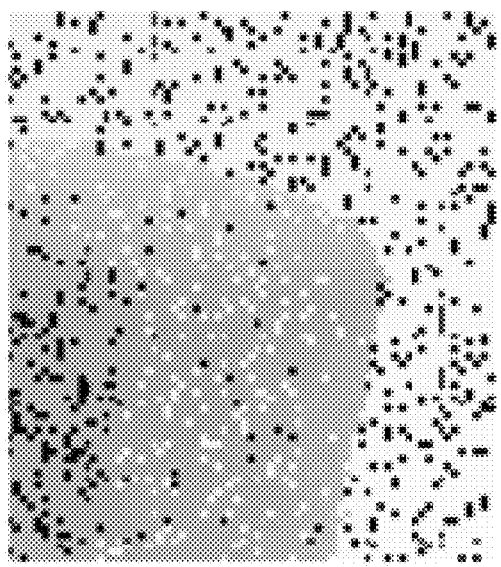 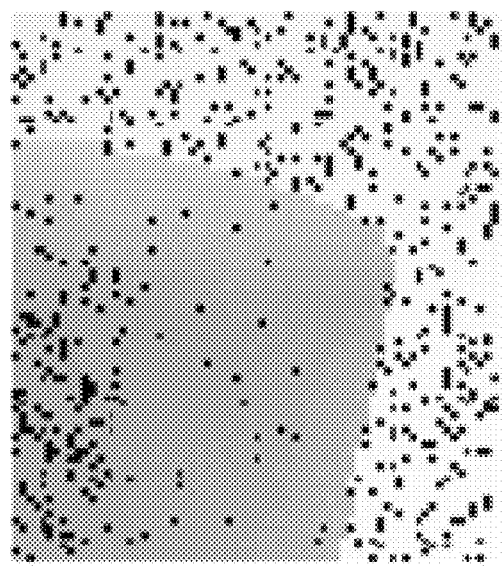
FIG. 6(a)        FIG. 6(b)

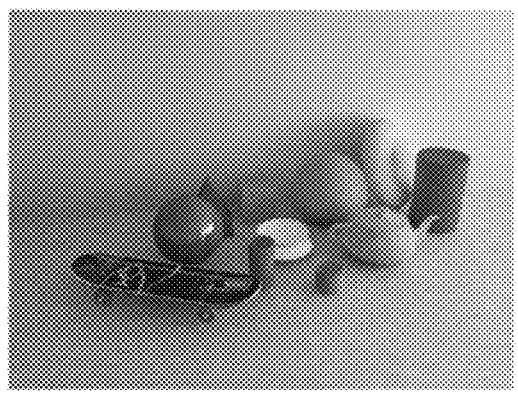
(a) Input left color view (resolution: 800x600)
(b) Input right color view (resolution: 800x600)
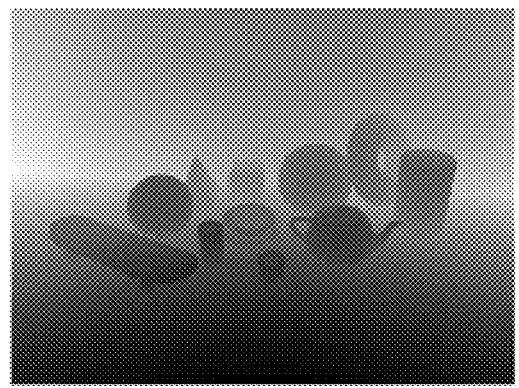
(c) Input depth image at the middle view (resolution: 800x600)
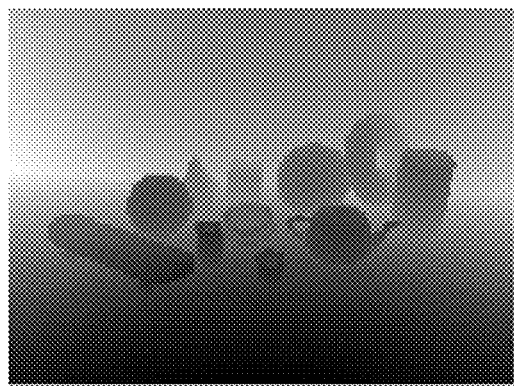
(d) Input low resolution depth image at the middle view (resolution: 160x120)
FIG. 15

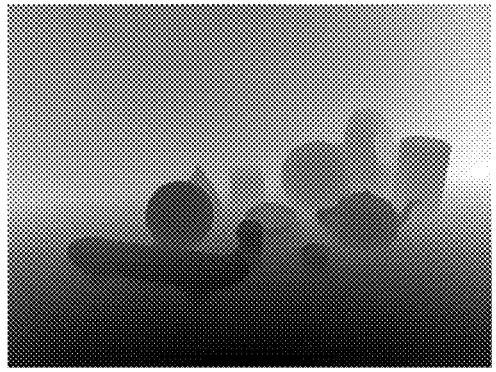
(e) Propagated and enhanced depth image at the left color view for high resolution depth case
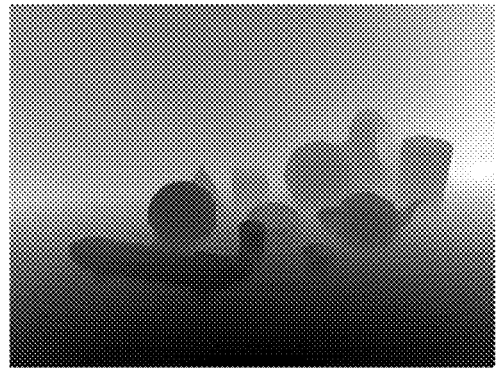
(f) Propagated and enhanced depth image at the left color view for low resolution depth case
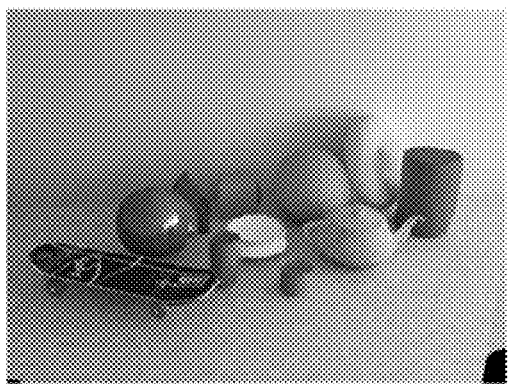
(g) Rendered image for high resolution depth case
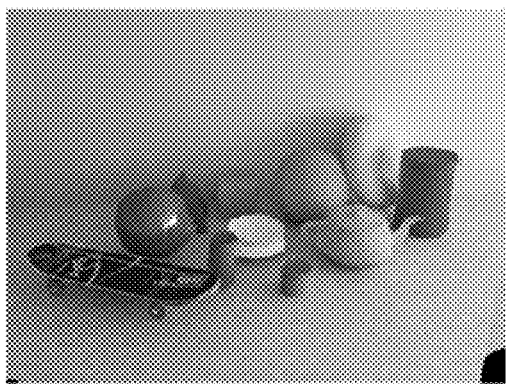
(h) Rendered image for low resolution depth case
*FIG. 15 Cont.*

SYSTEM FOR EXECUTING 3D PROPAGATION FOR DEPTH IMAGE-BASED RENDERING

REFERENCE TO EARLIER FILED APPLICATION

This application claims the benefit under 35 U.S.C. §119(e) of U.S. Provisional Patent Application No. 61/262,451, filed Nov. 18, 2009, which is incorporated herein, in its entirety, by this reference.

TECHNICAL FIELD

The present disclosure relates generally to 3D image processing, and more particularly, to a system for executing 3D propagation for depth image-based rendering of a 3D colored image with one or more color cameras and at least one depth camera at arbitrary positions.

BACKGROUND

Image-based rendering (IBR) is the process of synthesizing new "virtual" views from a set of "real" views. Obviating the need to create a full geometric 3D model, IBR is relatively inexpensive compared to traditional rendering while still providing high photorealism. Because IBR rendering time is independent of the geometrical and physical complexity of the scene being rendered, IBR is also extremely useful for efficient rendering of both real scenes and complex synthetic 3D scenes. Therefore, IBR has attracted a lot of research interest recently. Its applications can be found in many areas such as 3DTV, free-viewpoint TV, telepresence, video conferencing, and computer graphics.

Depth IBR (DIBR) combines 2D color images with per-pixel depth information of the scene to synthesize novel views. Depth information can be obtained by stereo match or depth estimation algorithms. These algorithms, however, are usually complicated, inaccurate and inapplicable for real time applications. Conventional DBIR implementations, furthermore, use images from cameras placed in a 1D or 2D array to create a virtual 3D view. This requires very expensive camera configurations and high processing resources and prevents development of real-time DIBR applications.

Thanks to the recent developments of new range sensors that measure time delay between transmission of a light pulse and detection of the reflected signal on an entire frame at once, per-pixel depth information can be obtained in real time from depth cameras. This makes the DIBR problem less computationally intense and more robust than other techniques. Furthermore, it helps significantly reduce the number of necessary cameras.

Some approaches for solving DIBR have been proposed in professional literature. McMillan with his warping method maps a point in an image to a corresponding point in another image at a different view as long as its depth value is known. However, this work considers only single views and did not take advantage of multiple views. Furthermore, warping is only the first step of the synthesis work. An additional problem is how to deal with newly-exposed areas (holes) appearing in the warped image, which will be discussed in more detail later. Some approaches to handle this problem have also been proposed. However, these approaches consider only the 1D case where the virtual camera is forced to be on the same line with real cameras and assumed that depth images are given in the same views with color images. This assumption may not be appropriate because not all depth cameras provide color information. Furthermore, standard color cameras are much cheaper and provide much higher color resolution than depth cameras. So the combination of a few depth cameras and many color cameras may be more feasible, as will be explored in more detail later. With such a configuration, the depth and color camera views will necessarily be different.

Another approach which focuses on signal processing techniques is a one-dimensional (1D) propagation algorithm developed in part by the assignees of the present application. H. T. Nguyen and M. N. Do, *Image-based Rendering with Depth Information Using the Propagation Algorithm*, Proceedings of IEEE International Conference on Acoustics, Speech, and Signal Processing (ICASSP), March 2005. Using depth information, surface points that correspond to pixels in the real images are reconstructed and re-projected onto the virtual view. Therefore, the real pixels are said to be propagated to the virtual image plane. Again, it is implied in the Nguyen and Do reference that color cameras and the depth (or range) camera must have the same resolution, the same location, and only the 1D case is considered.

BRIEF DESCRIPTION OF THE DRAWINGS

A more particular description of the disclosure briefly described above will be rendered by reference to the appended drawings. Understanding that these drawings only provide information concerning typical embodiments and are not therefore to be considered limiting of its scope, the disclosure will be described and explained with additional specificity and detail through the use of the accompanying drawings.

FIG. 5 is a graph showing that a point X can be warped from a reference image plane to a target image plane.

FIGS. 6(a) and 6(b) are an image of a patch in the propagated depth image respectively before and after the occlusion removal step of the method of FIG. 4.

FIG. 15 is a series of pictures showing input and output images from both low and high resolution depth cases from the processing of steps according to the method of FIG. 4, in which: (a) is an input left color view at a resolution of 800×600; (b) is an input right color view at a resolution of 800×600; (c) is an input depth image at a middle view at a resolution of 800×600; (d) is an input low resolution depth image at the middle view at a resolution of 160×120; (e) is a propagated and enhanced depth image at the left color view for the high resolution depth case; (f) is a propagated and enhanced depth image at the left color view for the low resolution depth case; (g) is a rendered image for the high resolution depth case; and (h) is a rendered image for the low resolution depth case.

DETAILED DESCRIPTION

Figure 1:
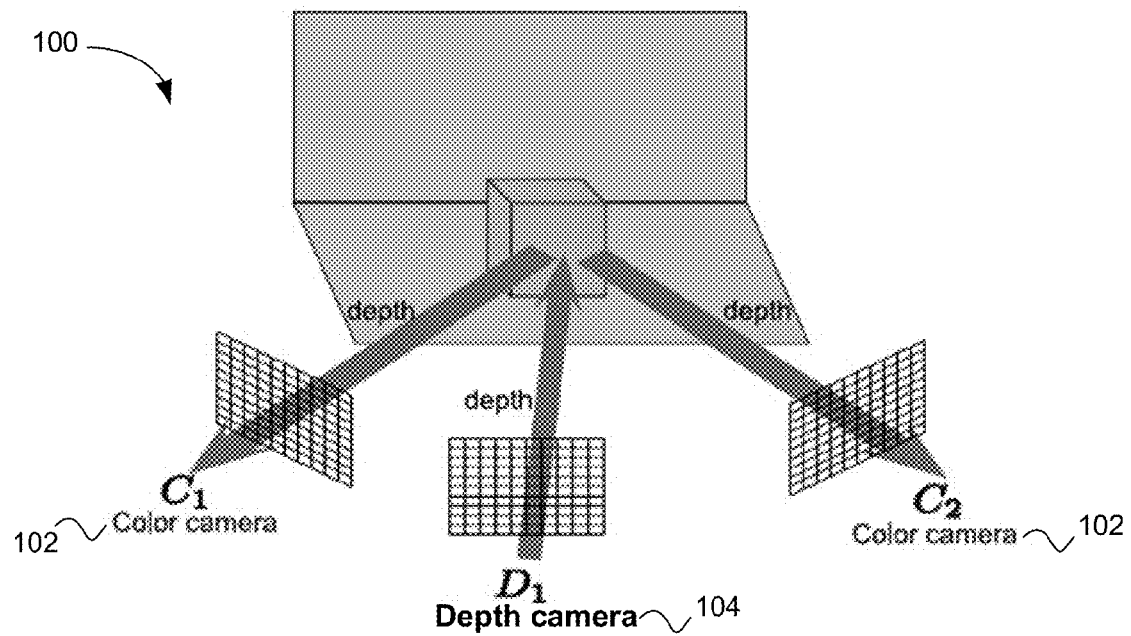
FIG. 1 is a diagram of an embodiment of a camera setup executing a depth image propagation step of the method disclosed herein in which depth information is propagated from depth cameras to color cameras.

Based on the above-discussed practical considerations and challenges presented by the same, this disclosure considers a generalized 3D case but with separate locations for the color and depth cameras. A disclosed system is adapted to execute a new occlusion removal method, to include a depth-color bilateral filter and disocclusion filling, to improve rendering quality. The proposed 3D propagation algorithm for solving depth image-based rendering (DIBR) combines images from one or more color and depth cameras at arbitrary positions in 3D space—relative to a scene to be rendered—and efficiently renders 3D colored images at arbitrary virtual views by propagating available depth information from depth cameras to color cameras, and then available depth and color information from color cameras to the virtual views. This can be accomplished with three main steps: (1) depth propagation; (2) color-based depth filling and enhancement; and (3) rendering. Considered is the case when only low resolution depth images are obtained. Proposed is a color-based depth filling and enhancement technique for enhancing depth imaging quality using high quality color images that significantly improves the rendering quality.

Herein, low resolution refers to the situation where the resolution of the depth camera is lower or much lower than that of the colored camera(s). High resolution refers to situation where the resolution of the depth camera is the same or higher than that of the color camera(s).

Also described is the abundant, but irregular parallelism of the proposed 3D algorithm based on which it may be mapped onto massively parallel architectures such as general purpose graphics processing units (GPGPUs). A preliminary GPU-based implementation of the system achieves 277 times faster than the sequential implementation. Experimental results show that the proposed parallelized algorithm running on a GPU provides excellent rendering quality while staying within computational bounds for real-time applications.

The major features of the proposed 3D propagation system and corresponding algorithm, and their respective benefits include, but are not limited to, that the system: (1) allows adaptable combination of high-resolution color cameras with low-resolution depth cameras, which is cheaper than a full fixed array of cameras; (2) cameras can be set up arbitrarily in 3D space; (3) uses color contrasts to improve edge rendering, which provides a better interpolated 3D view without requiring processing-hungry high depth detail; and (4) allows massively parallel processing, which provides faster processing, which once mapped to PGPUs, the proposed DIBR should be able to run in real time.

Most DIBR techniques focus on cases of 1D or 2D arrays of cameras while arbitrary camera configurations in 3D are rarely considered. Moreover, these techniques usually assume that depth images are available at the same location with color images. This assumption is true with depth estimation-based techniques but impractical for depth camera-based techniques because depth cameras generally do not provide color images. Another challenge with depth camera-based IBR techniques is that the resolution of depth images from depth cameras is often quite low. Since color cameras are much cheaper than depth cameras, the need for using a mixture of several cheap high resolution color cameras and a few low cost low resolution depth cameras becomes significant. That is, it would be very expensive to buy one or more high resolution cameras that have integrated depth and color imaging capabilities.

Because the geometric information in DIBR is usually captured in real time from the real physical world instead of from a modeling and synthetic world—which also makes DIBR more photorealistic—the obtained data suffers from noise and insufficient sampling effects. There is therefore a need to combine image processing techniques with rendering techniques to clean up the noise and fill in where the insufficient sampling leaves anomalies. This combination significantly increases the computations and is infeasible for real time applications without parallelism. Since rendering with full geometric information (color and depth) has been optimized for general purpose graphics processing units (GPGPUs), GPGPUs are considered the ideal computing platform and a good choice for DIBR applications. Accordingly, the proposed image processing algorithm was developed specifically to be suitable to run on a GPGPU hardware platform. In particular, included are techniques that have a high degree of locality (e.g., bilateral filtering) and that maximize massive parallelism (e.g., process pixels independently) whenever possible.

Figure 3:
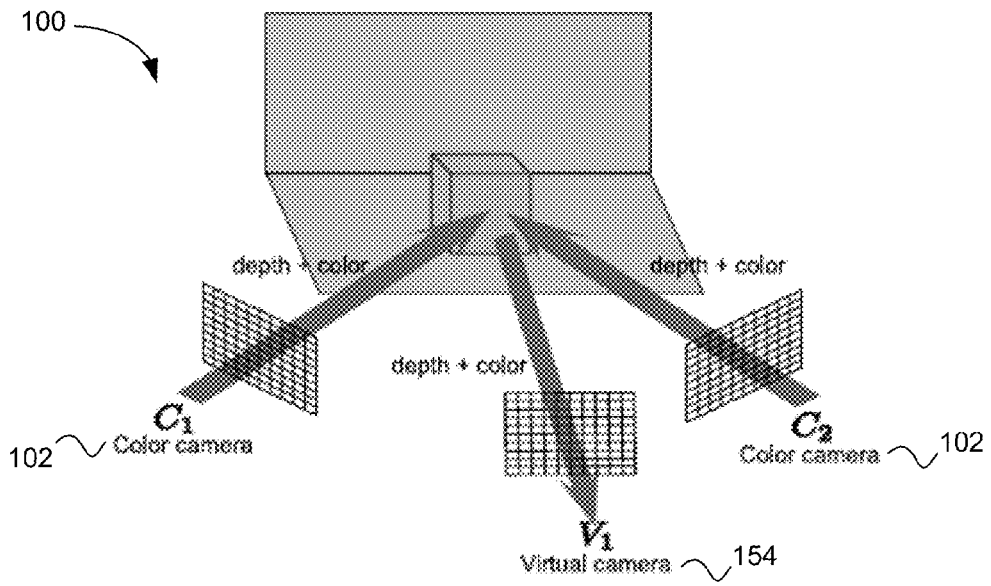
FIG. 3 is a diagram of the camera setup of FIG. 1 executing a rendering step, in which depth and color information from the enhanced depth images are propagated from the color cameras to a virtual camera view.

As reflected in FIGS. 1 and 3, the proposed 3D propagation system 100 seeks to, based on images collected from one or more color cameras 102 and depth (or range) cameras 104, render a new image at an arbitrary virtual view at a virtual camera 154. Assume that there are N color cameras 102 and M depth cameras 104 capturing a scene in 3D space. The inputs for the algorithm are a set of color images $\{I_i(x)\}_{i=1}^{N}$, depth images $\{d_j(x)\}_{j=1}^{M}$, and parameters of range and color cameras $\{C_i(x), f_i\vec{w}_i\}_{i=1}^{N+M}$ where $C_i$ is camera position of the $i^{th}$ camera, $f_i$ is its focal length, and $\vec{w}_i$ is its normalized viewing direction vector which points from $C_i$ to the image plane center. The output is a rendered image at virtual view $I_v(x)$. The proposed algorithm is based on the two following, basic assumptions: (i) Calibrated cameras: the positions, focal lengths, and viewing direction of all cameras are available; (ii) Lambertian surfaces: the color of a point on a surface is constant regardless the angle from which it is viewed.

I. 3D Propagation Algorithm

Figure 2:
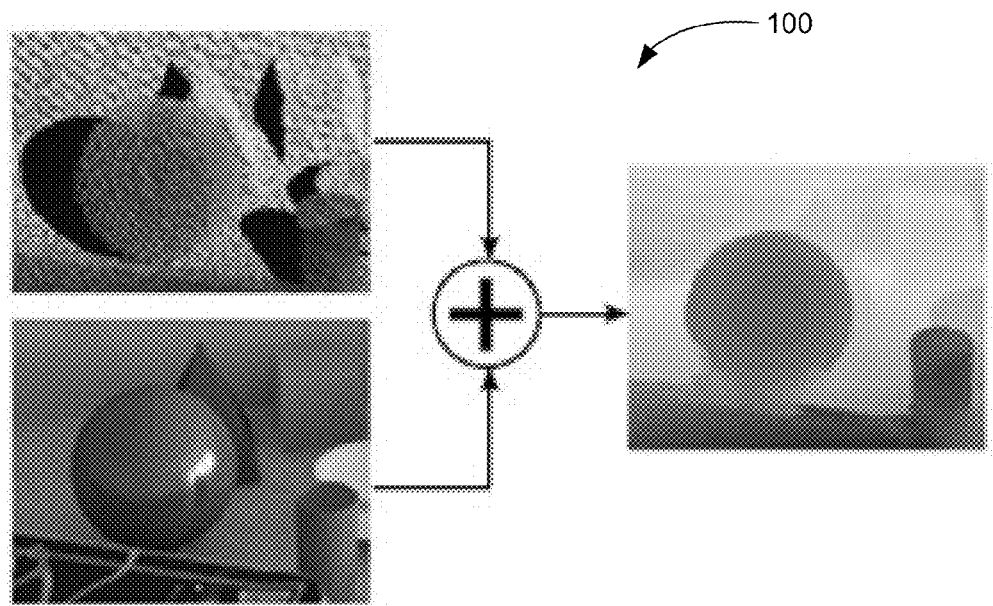
FIG. 2 is a pictorial diagram depicting the merging of a propagated depth image (top) with a color image (bottom) through the propagation step of FIG. 1 along with depth filing and enhancement processing to generate an enhanced depth image (right) at each color camera.

The proposed algorithm is divided into three main steps: (1.) Depth image propagation: Depth information from each depth camera is propagated to the image plane of every color camera (FIG. 1). (2.) Color-based depth filling and enhancement: signal processing techniques are applied to obtain an enhanced, complete depth image at each color camera (FIG. 2). (3.) Rendering: Depth and color information from each color camera are propagated to the virtual view, then merged and filtered to produce the output image (FIG. 3).

Figure 4:
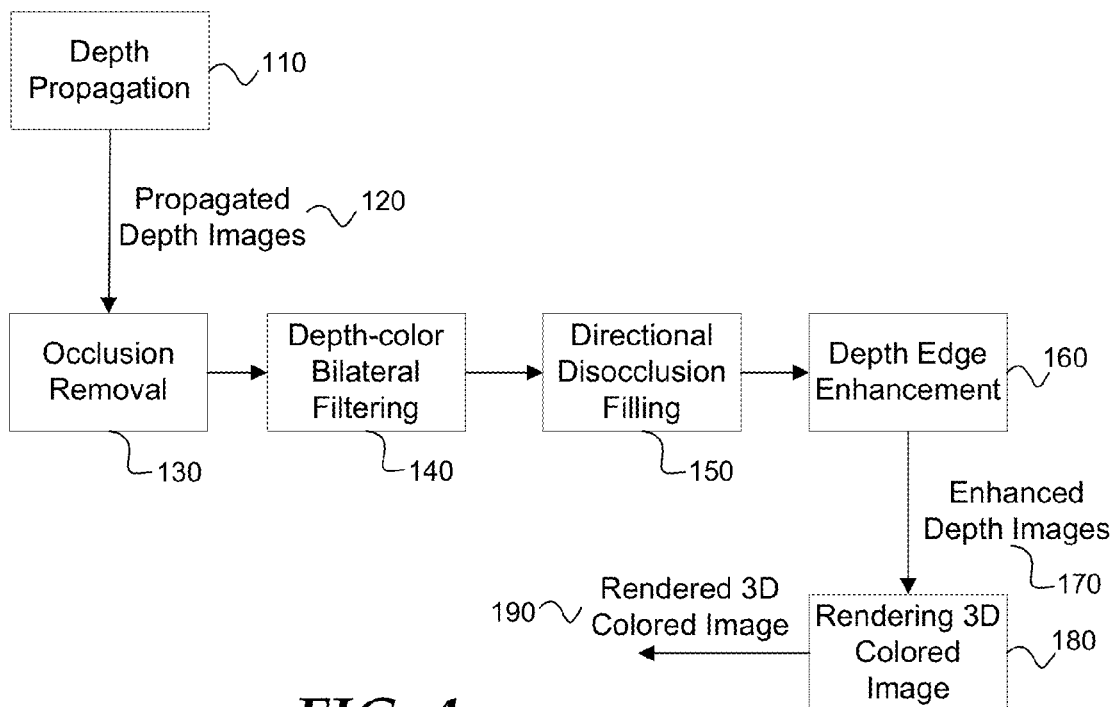
FIG. 4 is a flow chart of an exemplary method disclosed herein of 3D propagation for depth image-based rendering of a 3D colored image.

FIG. 4 is a flow chart of an exemplary method disclosed herein of 3D propagation for depth image-based rendering of a 3D colored image. Each of these steps will be described in more detail later.

At block 110, the system 100 performs depth propagation of depth information from the depth camera(s) 104 to the color cameras 102 to produce propagated depth images 120 through warping. At block 130, the system 100 performs occlusion removal on the propagated depth images 120 to replace occluded pixels in the colored images with newly interpolated values. At block 140, the system 100 performs depth-color bilateral filtering (DCBF) on the propagated depth images 120 for edge-preserving of the colored images by calculating unknown depth pixels at the image plane using color information. At block 150, the system 100 performs direction disocclusion filing on the propagated depth images 120 to fill holes caused by disocclusion at a plurality of epipoles of the colored images during image propagation (discussed in more detail later). At block 160, the system 100 performs depth edge enhancement on the propagated depth images 120 to sharpen depth edges surrounding objects in the propagated depth images, which results in enhanced depth images 170.

At each of the image processing steps at blocks 130 through 160, the propagated depth images 120 at each color camera 102 are further enhanced, resulting in enhanced depth images 170 at each respective color camera. In some examples, the processing steps at blocks 130 through 160 may be performed in a different order. The system 100 then, at block 180, renders a 3D colored image 190 from the merging of the enhanced depth images 170 from the color cameras 102 again through warping, but this time from a reference of the color cameras 102 to a target or desired view of the virtual camera 154. The system 100, by rendering the 3D colored image 190 at block 180 may also remove occlusions and process the rendered image with a median filter to fill and denoise the rendered image.

A. Depth Propagation

In this section, presented is how to propagate depth information from a depth camera 104 to a color camera 102. The depth camera is considered as the reference view and the color camera is considered as the target (or desired) view. The 3D warping technique referred to earlier allows the mapping of a point in a reference image to a corresponding point in a desired image at a different view as long as the system knows the depth value of that point. Consider a reference camera $\{C_r, f_r, \vec{w}_r\}$ and a desired camera $\{C_d, f_d, \vec{w}_d\}$ in a 3D Euclidian space with basis vectors $(\vec{i}, \vec{j}, \vec{k})$.

It is known that each point of an image in 2D space can be mapped one-to-one with a ray in 3D space that goes through the camera position. Given a 2D image plane with basis vectors $(\vec{s}, \vec{t})$ and a 3D space $(\vec{i}, \vec{j}, \vec{k})$, the 2D point to 3D ray mapping relation is:

$$\vec{r} = \begin{bmatrix} r_i \\ r_j \\ r_k \end{bmatrix} = \begin{bmatrix} \vec{s}_{ijk} & \vec{t}_{ijk} & f * \vec{w}_{ijk} \end{bmatrix} \begin{bmatrix} u \\ v \\ 1 \end{bmatrix} = P \begin{bmatrix} u \\ v \\ 1 \end{bmatrix} \quad (1)$$

where (u,v) is the 2D coordinate of the point in the image plane; $\vec{r}$ represents the corresponding ray's direction; $\vec{s}_{ijk}$, $\vec{t}_{ijk}$ and $\vec{w}_{ijk}$ are representations of $\vec{s}$, $\vec{t}$; and viewing direction $\vec{w}$ in $\{\vec{i}, \vec{j}, \vec{k}\}$. Matrix P is called the mapping matrix.

With reference to FIG. 5, consider a point X in 3D space $\{\vec{i}, \vec{j}, \vec{k}\}$. Let $\vec{x}_r$ and $\vec{x}_d$ be homogeneous coordinates of X in the reference image plane and the target (or desired) image plane. Let $P_r$ and $P_d$ be mapping matrices of the reference camera and the target camera. It has been proven that the warping equation between $\vec{x}_r$ and $\vec{x}_d$ is:

$$\vec{x}_d = P_d^{-1}\left(\frac{|P_r\vec{x}_r|}{d(\vec{x}_r)}(C_r - C_d) + P_r\vec{x}_r\right) \quad (2)$$

where $d(\vec{x}_r)$ is the depth value of point $\vec{x}_r$. Then the visibility algorithm that specifies the warping order is used to handle many-to-one mapping cases where more than one point in the reference image are mapped to the same point in the target image. FIGS. 14(a) and 14(e) show parts of the incomplete propagated depth image $D_{prop}$ for low resolution depth case. Note that all figures about depth images in this paper are grayscale-coded for better visualization.

B. Color-Based Depth Filling and Enhancement

This step fills depth pixels and performs depth image enhancement to prepare for the rendering step and was discussed with reference to blocks 130 through 160 of FIG. 4.

Unknown depth patches or holes, represented by black color in FIGS. 14(a) and 14(e), are caused by two reasons. First, uniform sampling in the reference image becomes non-uniform sampling in the target image. This means that in some certain patches, there are fewer sample points than in some other patches. Those holes can be filled by the interpolation step using depth-color bilateral filtering (DCBF), introduced at block 140 of FIG. 4. Second, holes are also created when occluded areas in the reference image are revealed in the desired image, which is a disocclusion problem. It seems to be impossible to fill these holes. However, for the present setting, the system 100 has full color information at the target view. Therefore, these holes can be interpolated based on the color image at the target view through directional disocclusion filing, introduced at block 150 in FIG. 4.

In addition, as shown in FIG. 6(a), some background sample points (the brighter specs) visible in the reference depth image should be occluded by the foreground (pixels with darker color) in the desired depth image but are still visible. That significantly degrades the interpolation quality. Therefore, an occlusion removal step is necessary to correct those points before performing further processing steps.

1) Occlusion Removal (disocclusion): The occlusion removal method presented herein is based on the smoothness of surfaces. If a point (or pixel) A in $D_{prop}$ is locally surrounded by neighboring points (or pixels) whose depth values are σ smaller than the depth of A, then A is selected to be occluded by the surface composed of those neighbors.

Figure 7:
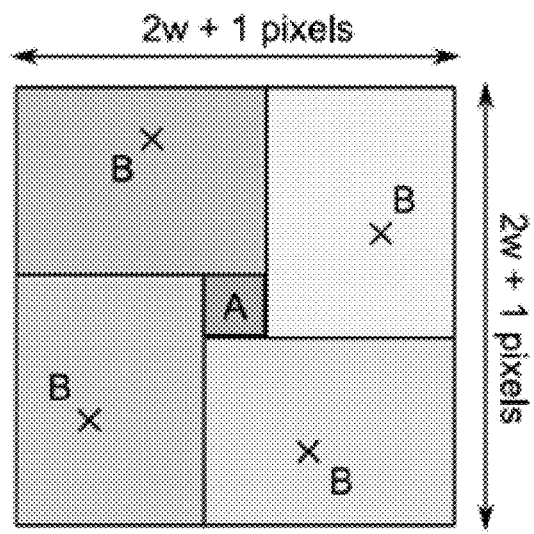
FIG. 7 is a diagram that illustrates the way to partition the support window in the occlusion removal step of the method of FIG. 4.

As shown in FIG. 7, for every point A, a(2w+1)×(2w+1) window whose center is A is divided into four partitions. If there are at least three of those partitions each of which has at least one point B such that depth(A)−depth(B)>σ, then point A is selected to be occluded and its depth is replaced by a new interpolated value. FIGS. 6(*a*) and 6(*b*) shows a patch of $D_{prop}$ before and after occlusion removal step respectively. In our experiment, discussed below, we choose w=3.

2) Depth-color bilateral filtering (DCBF): Bilateral filtering is a basic, non-iterative scheme for edge-preserving smoothing. It is a combination of a spatial filter, whose weights depend on Euclidian distance between samples, and a range filter, whose weights depend on differences between values of samples. Bilateral filtering is usually applied only for color images and provides excellent enhancement quality. In this disclosure, by integrating known depth and color information, the proposed DCBF effectively interpolates unknown depth pixels in $D_{prop}$ caused by non-uniform resampling while keeping sharp depth edges. The DCBF is defined as following:

$$d_A = \frac{1}{W_A} \sum_{B \in S_A} G_{\sigma_s^2}(|\vec{x}_A - \vec{x}_B|) \cdot G_{\sigma_r^2}(|I_A - I_B|) \cdot d_B \quad (3)$$

$$W_A = \sum_{B \in S_A} G_{\sigma_s^2}(|\vec{x}_A - \vec{x}_B|) \cdot G_{\sigma_r^2}(|I_A - I_B|) \quad (4)$$

where
$d_A$: depth value of point A.
$I_A$: color value of point A.
$\vec{x}_A = [u_A, v_A]$: 2D coordinate of point A.
$S_A$: set of A neighboring point s.
$G_\sigma(|\vec{x}|) = \exp\left(\frac{-|\vec{x}|^2}{2\sigma^2}\right)$: Gaussian kernel.
$W_A$: normalizing term.

The idea of using color differences as a range filter to interpolate depth value is based on the observation that whenever a depth edge appears, there is almost always a corresponding color edge due to color differences between objects or between foreground and background. The DCBF also works well with textured surfaces since it counts only pixels on that surface which have similar color to the interpolated pixel. If surfaces have the same color, color does not give any new information and the DCBF works as a basic interpolation scheme such as bilinear or bicubic. FIGS. 15(*b*) and 15(*f*) show parts of the obtained depth image after the DCBF step for the low resolution depth case. The black areas caused by disocclusion are handled in section I-B3.

Case of low resolution depth images: In practice, most depth cameras—such as from Canesta of Sunnyvale, Calif. or Prime-Sense of Tel-Aviv, Israel—provide depth images with lower resolution than that of the color images. In the presently-disclosed methods, the available depth information is first propagated to the color camera. Then the DCBF step is proceeded to calculate unknown depth pixels at the color image plane based on color information from the high resolution color image. As discussed earlier, an advantage of the DCBF filter is its ability to combine color and depth information for edge preserving interpolation. Therefore, the proposed algorithm can work well with different resolution settings of the cameras, which may occur more frequently when using cameras from different manufacturers.

Figure 8:
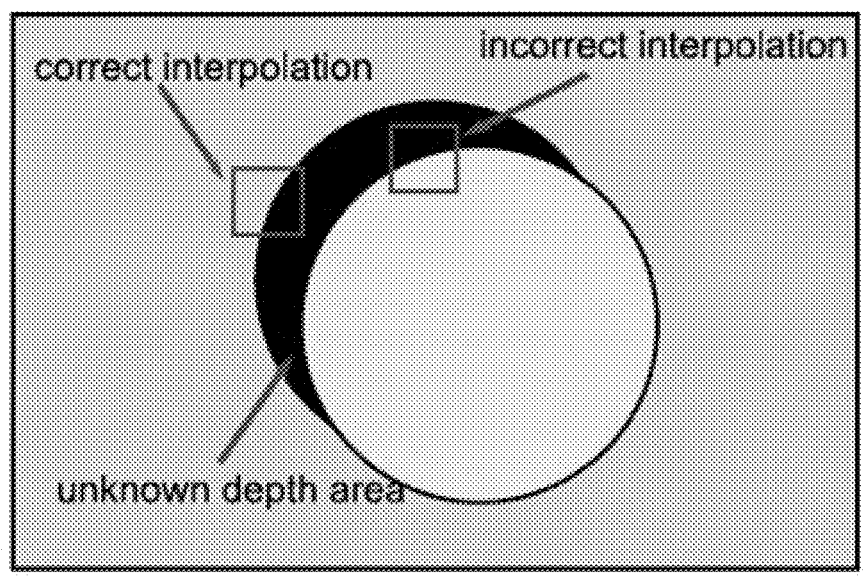
FIG. 8 is a diagram showing the problem with non-directional disocclusion filing related to the disocclusion filing step of the method of FIG. 4.

3) Disocclusion filling: In order to fill holes caused by disocclusion, the DCBF can also be used, but it needs to follow a specific direction. Otherwise, filtering is performed from all directions, incorrect depth values may be obtained. As described in FIG. 8, filling from right-to-left causes incorrect interpolating depths because the holes should be filled with the background's depth whereas all neighboring known depth values belong to the foreground. It was observed that, in the 2D image plane, the disocclusion holes always appear toward the projection of the reference camera position onto the target or desired image plane, e.g., the projection originates from an "epipole" of the reference camera view. So a relationship must exist between the disocclusion holes and the camera position.

Figure 9:
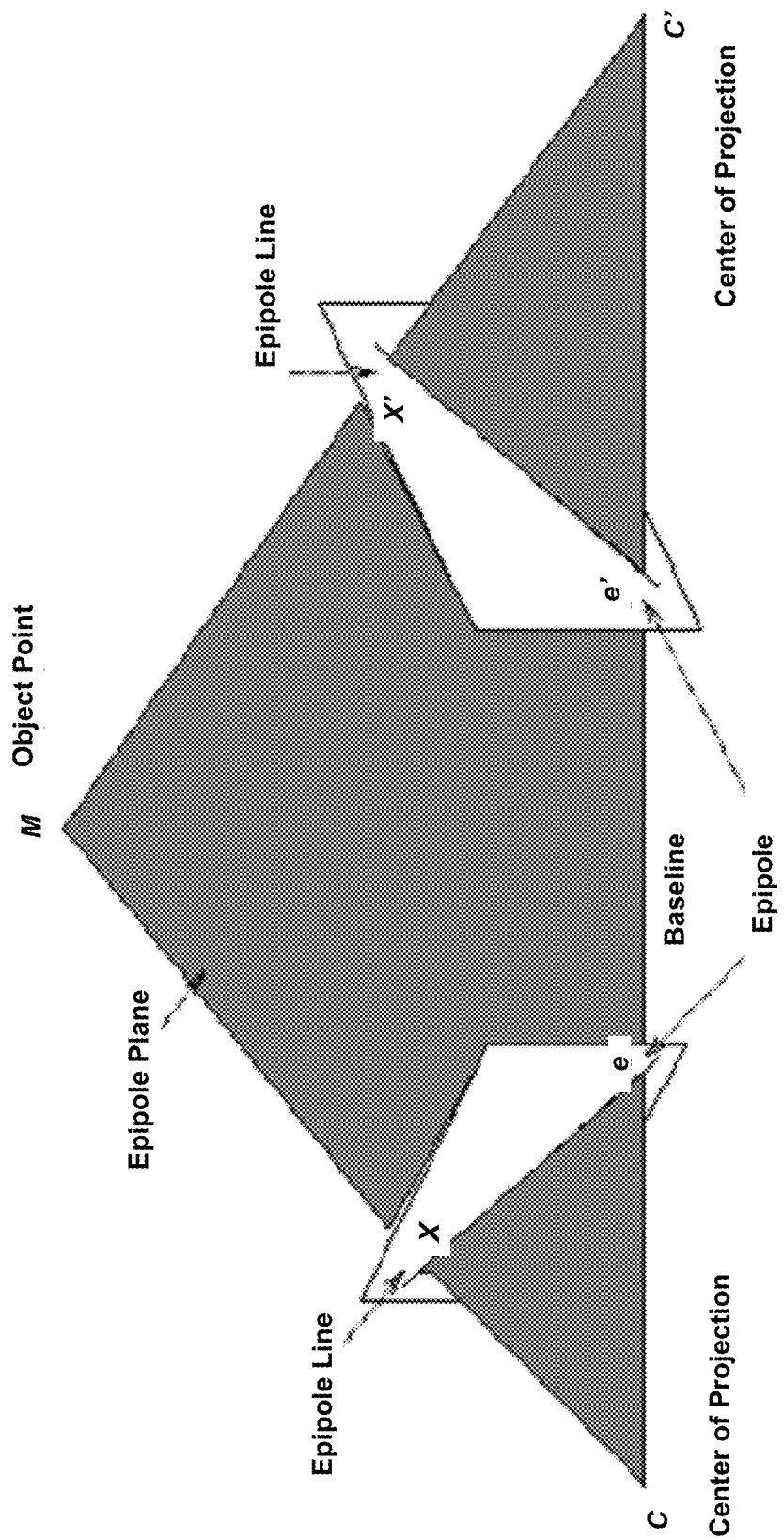
FIG. 9 is a diagram explaining the meaning of an epipole, an epipole line, and an epipole plane with respect to two camera views and one object point.

With reference to FIG. 9, an epipole is the point of intersection of the line joining the optical centers, e.g., the baseline, with the image plane. Thus, the epipole is the image in one camera of the optical center of the other camera. The epipolar plane is the plane defined by a 3D point M and the optical centers C and C'. The epipolar line is the straight line of intersection of the epipolar plane with the image plane. The epipolar line is thus the image in one camera of a ray through the optical center and image point in the other camera. All epipolar lines intersect at the epipole.

Figure 10:
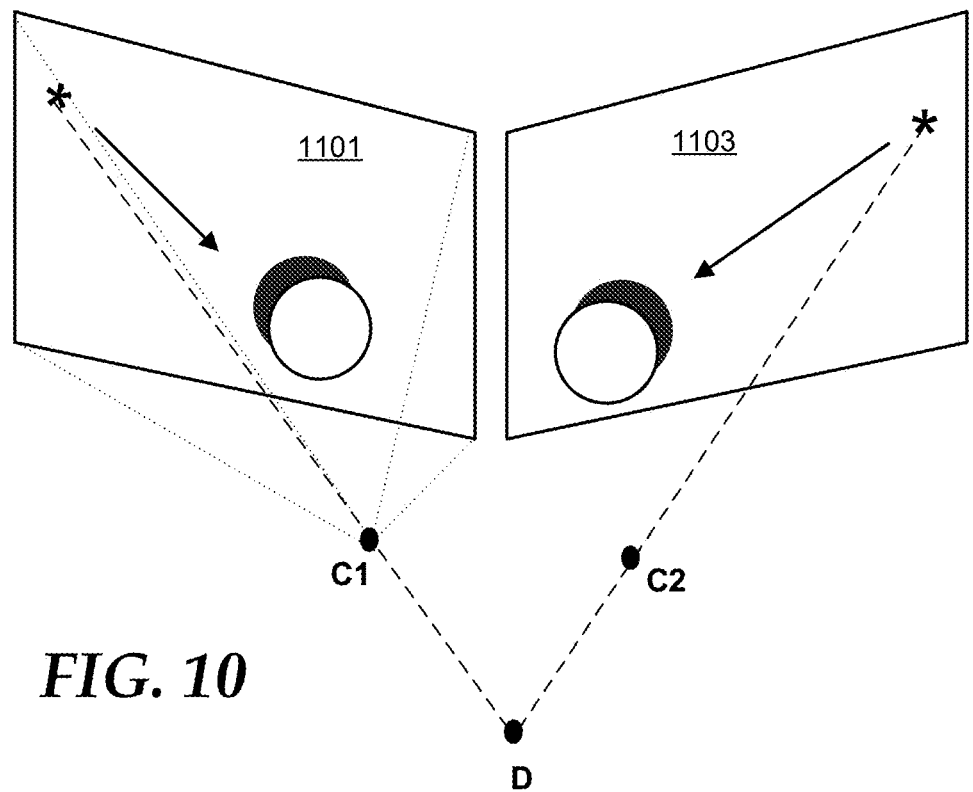
FIG. 10 is a diagram showing epipoles at the stars for two pairs of cameras, a color camera and a depth camera, and disocclusion holes of depth information caused by the mutual location of the color cameras and the depth camera.

With reference to FIG. 10, D is the center of the depth camera 100 while C1 and C2 are the centers of two color cameras 102. This provides two pairs of cameras {C1, D} and {C2, D}. Each star is an epipole for each camera pair. Each square 1101 and 1103 is a cross section view of the image plane at the epipole line associated with the epipole for each respective camera pair. The clear circle is an arbitrary object in a scene being photographed. The black area extended behind the arbitrary object is the disocclusion hole. The disocclusion hole is the area that cannot be seen from the viewpoint of D because it is occluded by the circle, but that can be seen from the viewpoint of C1 or C2 because the viewpoint is different from points C1 and C2. At viewpoints C1 and C2, therefore, there is missing depth information in the black areas that need to be filled with some value.

Figure 11:
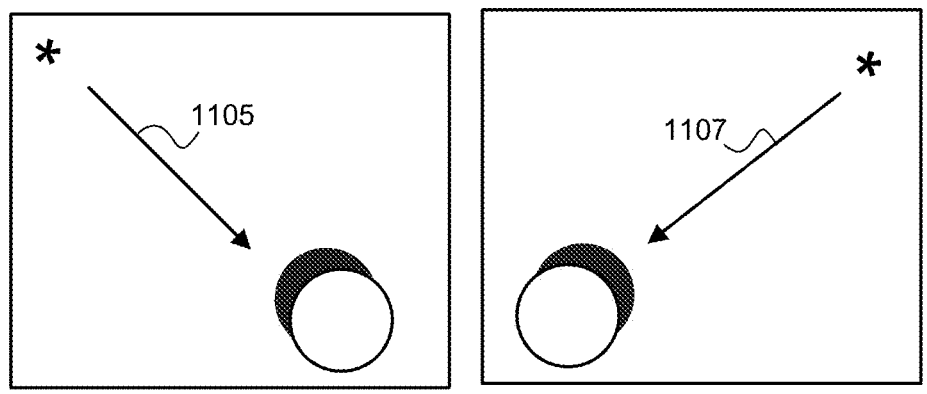
FIG. 11 is a diagram showing filling directions to fill in the disocclusion holes with neighboring values.

With reference to FIG. 11, the black area (or disocclusion hole) always appears toward the epipole. So, to fill the disocclusion holes, the filling directions should be along the lines of arrows 1105 and 1107 respectively for enhancing images at cameras {C1, D} and {C2, D}. In other words, the filling directions can be decided correctly based on drawing a line from the epipole for each respective color camera to the center of the target depth image.

Figure 12A:
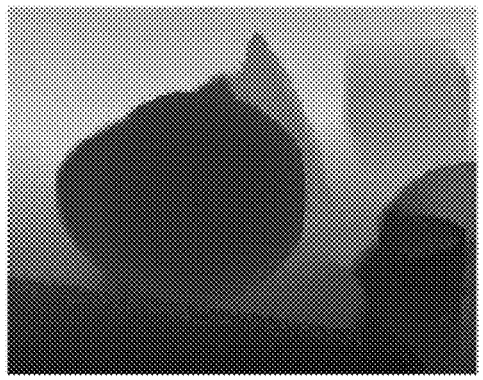
FIGS. 12(a) and 12(b) are partially-enhanced pictures of a propagated depth image, respectively after non-directional bilateral filling and directional bilateral (or disocclusion) filing related to the directional disocclusion filing step of the method of FIG. 4.
Figure 12B:
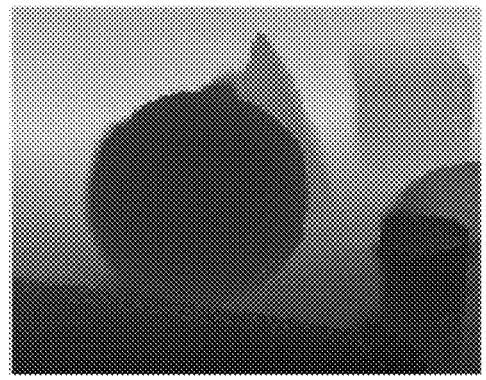
Figure 14:
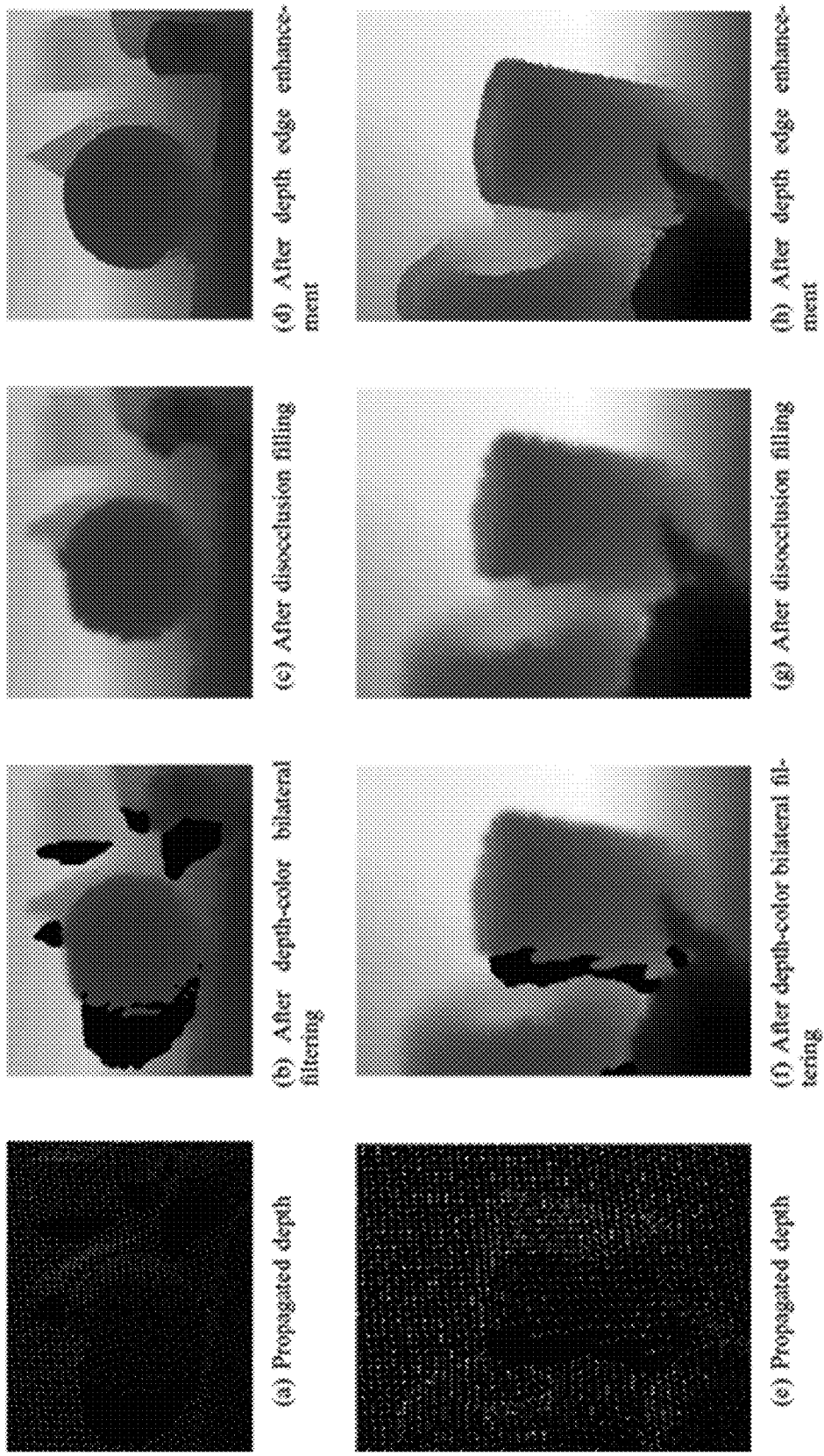
FIG. 14 is a series of pictures showing a low-resolution depth example from the processing steps according to the method of FIG. 4, short of rendering, in which: (a) and (e) display a propagated depth image; (b) and (f) display the propagated depth image after depth-color bilateral filing; (c) and (g) display the propagated depth image after subsequent directional disocclusion filing; and (d) and (h) display the propagated depth image after edge enhancement.

More specifically, the epipole $\vec{e}$ can be computed as follows:

$$[e_x, e_y, e_z]^T = P_d^{-1}(C_r - C_d) \quad (4)$$

$$\vec{e} = (e_x/e_z, e_y/e_z) \quad (5)$$

where $C_r$ and $C_d$ are positions of the reference and target views and $P_d$ is the mapping matrix of the target view. Then, the filling direction is a vector pointing from the epipole to the center of the target depth image. For example, if the epipole lies in the top left quadrant of the image, the filling should start from the top left corner such as shown in the left half of FIG. 11. And, likewise, if the epipole lies in the top right quadrant of the image, the filling should start from the top right corner such as shown in the right half of FIG. 11. FIGS. 12(*a*) and 12(*b*) are respectively indicative of a propagated depth image processed by non-directional bilateral filling and by directional bilateral filling. Note the improvement in the features of FIG. 12(*b*) that makes the objects look more like the real objects. FIGS. 14(*c*) and 14(*g*) show parts of the complete propagated depth image for the low resolution depth case after filling disocclusion areas.

4) Depth edge enhancement: Even though the DCBF preserves edges while filtering, it still cannot provide truly sharp depth edges. Tiny blurring depth edges around objects can be seen in FIG. 13(a) or FIGS. 14(c) and 14(g). Sharp depth edges are extremely important for the rendering step because, at some rendered viewpoint, tiny blurring edges may blow up to a large smearing region in the rendered color image, which is not visually pleasing. Therefore, enhancing depth edges is a task that should be performed before rendering.

The proposed depth edge enhancement technique may include two steps. First, the system 100 detects depth edge gradients with Sobel operators in vertical, horizontal, and two diagonal directions. To diminish the effect of noise, the depth image needs to be slightly smoothed first. The DCBF can also be applied here. Then the system 100 may classify pixels with significant edge gradients as adjustable depth pixels and the rest of pixels are fixed depth pixels. A significant edge gradient may be determined based on edge gradients beyond a predetermined threshold gradient value.

Secondly, for each adjustable depth pixel, a block-based search is applied to find a neighboring fixed depth pixel that best matches in color. Once the best color-matched pixel is chosen, the depth value of that pixel is copied to that of the adjustable depth pixel. This second step may be iterated through a few times so that most of the adjustable depth pixels are adjusted. The iteration does not slow down the speed too much since the process is purely parallel and can be done extremely fast on the GPU.

With more specificity, given a pixel $x=[x_u, x_v]$ in an image plane $\aleph$, I(x) and D(x) are color and depth values, respectively, of pixel x. Let a δ– neighborhood of $xN_\delta(x)$ be defined as:

$$xN_\delta(x) = \{y \in \aleph \mid |y_u - x_u| < \delta \ \& \ |y_v - x_v| < \delta\} \quad (6)$$

Let $G_u$ and $G_v$ be the horizontal and vertical Sobel kernel. Generally, $G_u$ and $G_v$ can be the size of 3×3, 5×5, or 7×7. In our experiments, we use the 3×3 Sobel kernel. Let $\aleph_u$ be the set of undetermined depth pixels and let $P_{\omega,\alpha}(x) = \{y \in \aleph : y \notin \aleph_u, y \in N_{\alpha+\omega}(x), y \notin N_x(x)\}$ be the search range of pixel x.

The following pseudo-code of the proposed depth edge enhancement stage may then be applied to complete the depth edge enhancement stages. In the following pseudo-code, $T_s$ and $T_p$ are thresholds; ω and α determine the search window size; and β determines the comparison block size.

```
%Apply the Sobel operator to detect depth gradient
For each x ∈ ℵ
    S_δ(x) = Sobel(N_δ(x))
        = (G_u * N_δ(x))² + (G_v * N_δ(x))²
    If S_δ(x) > T_s
        ℵ_u = ℵ_u + {x}
    EndIf
Endfor
%Perform block-based search in color domain
For each x ∈ ℵ_u
    For each y ∈ P_{w,α}(x)
        If ∃y_0 ∈ P_{ω,α}(x): ∀y ∈ P_{ω,α}(x),
           ||I(N_β(y)) − I(N_β(x))||_2 ≥ ||I(N_β(y_0)) − I(N_β(x))||_2 ≥ T_p
           D(x) = D(y_0)
           ℵ_u = ℵ_u − {x}
        Endif
    Endfor
Endfor.
```

Figure 13A:
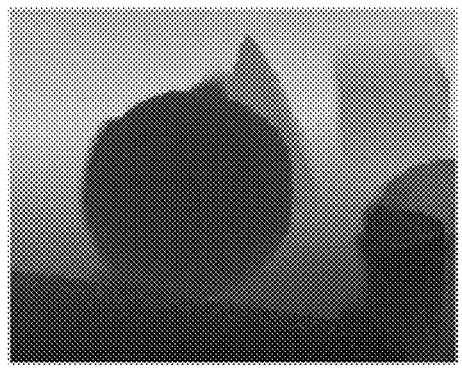
FIGS. 13(a) and 13(b) is a picture of a propagated depth image, respectively before and after application of the depth edge enhancement step of the method of FIG. 4.
Figure 13B:
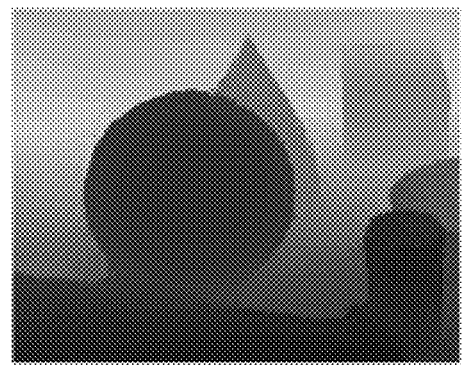

Experimental results show that the previously-discussed depth edge enhancement technique works very well even for the low resolution depth case as shown by comparing FIG. 13(a) with FIG. 13(b) and comparing FIG. 14(c) with FIG. 14(d) and FIG. 14(g) with FIG. 14(h). The reason is that there is no texture in a depth map so the significant depth gradients only appear around the true depth edges and at the same location with color gradients. Information about color edges in the high quality color images can be used to decide and sharpen the true depth edges. Since the depth values of pixels in a small vicinity of the same object are almost the same, directly copying a depth value from one neighboring pixel of the same object can significantly reduced the computations whereas the enhancement quality is still preserved.

C. Rendering

Now each color camera has both depth and color information. The last step is propagating this information to the virtual camera 154. The color cameras 102 become the reference views and the virtual camera 154 becomes the target (or desired) view. This process is quite similar to the first two parts of the algorithm. First, the system 100 propagates depth and color information of each color view into the virtual view using the same technique disclosed in section I-A. Then, the system 100 performs the occlusion removal technique disclosed in section I-B1 at the virtual view. Finally, the rendered image is filled and denoised with a 3×3 or other suitably-sized median filter as is known in the art of image filtering. Note that most of the unknown color pixels in this step are caused by non-uniform resampling since the color cameras are intentionally installed in a way to capture the whole scene from different views and, therefore, reduce as much as possible the holes caused by disocclusion. The complete rendered image is shown in FIGS. 15(g) and 15(h).

II. Exemplary System and GPU Hardware/Software

Figure 16:
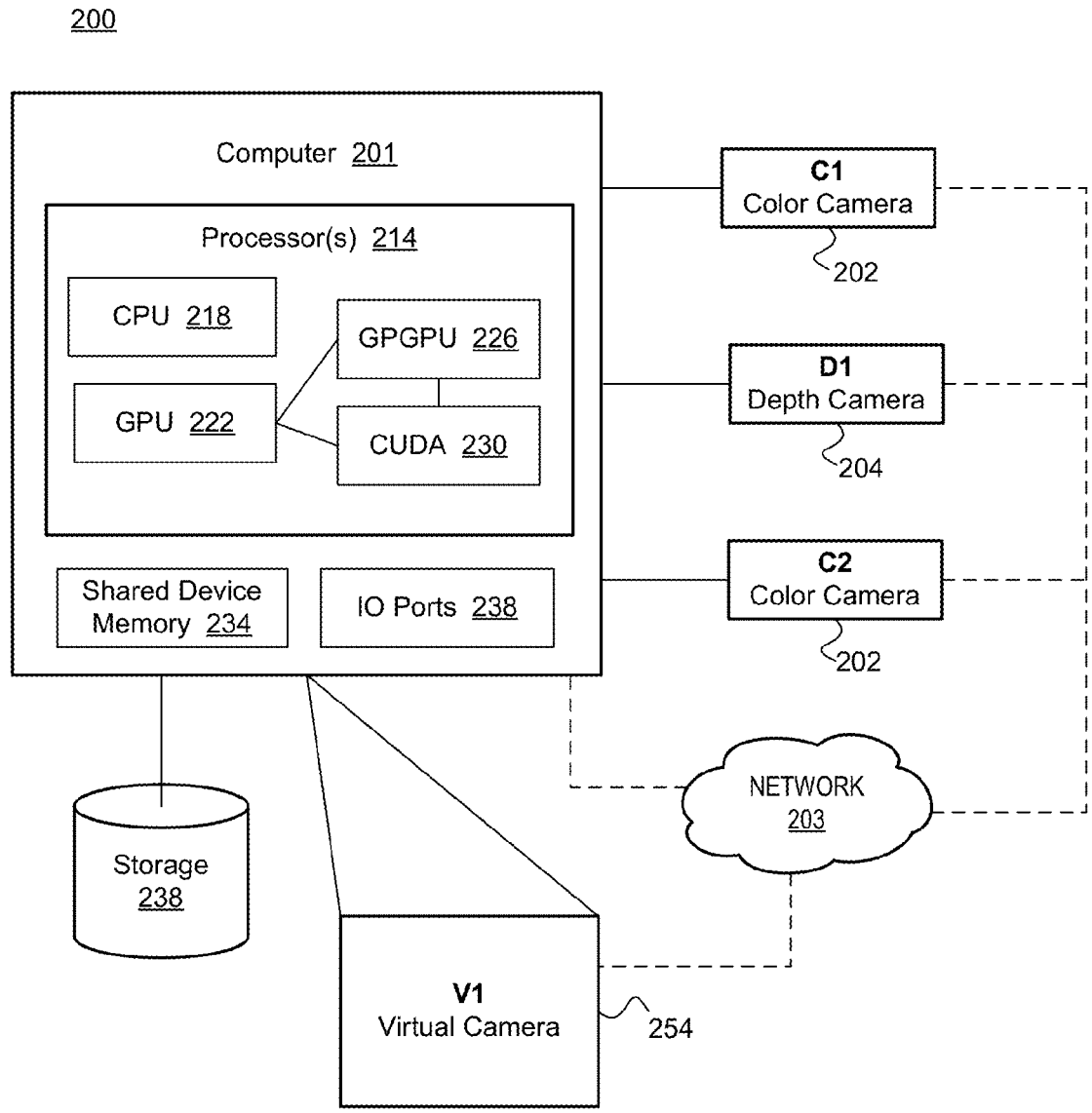
FIG. 16 is a system diagram of an embodiment of a system configured to implement the methods disclosed with reference to FIGS. 1-15.

FIG. 16 displays an embodiment of a system 200 including a computer 201 coupled with a plurality of color cameras 202 and at least one depth camera 204 to obtain the images at the various views required by the disclosed propagation algorithm. Herein, the phrase "coupled with" is defined to mean directly connected to or indirectly connected through one or more intermediate components. Such intermediate components may include both hardware and software based components. For instance, the components of the system 200 may connect indirectly through any sort of network 203 such as a LAN, a WAN, a wireless network, the World Wide Web, or some other local, secured network. The computer 201 may be a processing device of any kind, such as a server or a super computer, having sufficient processing power as will be described. The computer 201 is further coupled with one or more processors 214, including a central processing unit (CPU) 218, one or more GPUs 222, and general-purpose graphics processing units (GPGPU) 226 optionally combined with compute unified device architecture (CUDA) 230.

The computer 201 also may be coupled with shared device memory 234, both static and dynamic, other system storage memory 238, and a plurality of IO ports 242, as required to connect to the plurality of color cameras 202 and the at least one depth camera 204. The computer 201 and the system 200 are further coupled with or otherwise include other hardware and/or software as would be evident to one skilled in the art of image processing, particularly with regards to the hardware and software disclosed herein. As discussed above, the ultimate output of the system includes an arbitrary virtual view at a virtual camera 254, which can include a camera, or another display device such as a monitor, computer or TV screen.

Images captured at various positions by the plurality of colored cameras 202 and the at least one depth (or range) camera 204 are processed by the GPU 222, which may be run by the GPGPU 226 as well as by the CUDA 230. General-purpose computing on graphics processing units (GPGPU, also referred to as GPGP and to a lesser extent $GP^2$) is the technique of using a GPU, which typically handles computation only for computer graphics, to perform computation in applications traditionally handled by the CPU. It is made possible by the addition of programmable stages and higher precision arithmetic to the rendering pipelines, which allows software developers to use stream processing on non-graphics data. These pipelines enable mapping to massively parallel architectures such as GPGPU to allow real-time rendering of at least 76 times faster than serial rendering, even on a mediocre graphics card.

In November 2006 Nvidia of Santa Clara, Calif. launched CUDA 230, a software development kit (SDK) and application programming interface (API) that allows a programmer to use the C programming language to code algorithms for execution on Geforce 8 series GPUs. AMD of Sunnyvale, Calif. offers a similar SDK for their ATI-based GPUs and that SDK and technology is called Stream SDK (formerly CTM, Close to Metal), designed to compete directly with Nvidia's CUDA. AMD has also announced the AMD FireStream product line (combining CPU and GPU technology on one chip). Compared, for example, to traditional floating point accelerators such as the 64-bit CSX700, boards from ClearSpeed that are used in today's supercomputers, current top-end GPUs from Nvidia and AMD emphasize single-precision (32-bit) computation as double-precision (64-bit) computation executes much more slowly. Any of these SDKs, or improvement thereto, may be employed for execution by the GPUs of the present disclosure.

With more particularity, CUDA—or AMD's equivalent—is a parallel programming model and software environment providing general purpose programming on the GPUs 222. At the hardware level, the GPU device is a collection of multi-processors each consisting of eight scalar processor cores, instruction unit, on-chip shared memory, and texture and constant memory caches. Every core has a large set of local 32-bit registers but no cache. The multiprocessors follow the SIMD architecture, e.g., they concurrently execute the same program instruction on different data. Communication among multiprocessors is realized through the shared device memory that is accessible for every processor core.

On the software side, the CUDA programming model extends the standard C/C++ programming language with a set of parallel programming supporting primitives. A CUDA program consists of a host code running on the CPU 218 and a device code running on the GPU 222. The device code is structured into so-called kernels. A kernel executes the same scalar sequential program in many data independent parallel threads. Within the kernel, threads are organized into thread blocks forming a grid of one or more blocks. Each thread is given a unique index within its block threadIdx and each block is given a unique index blockIdx within the grid. The threads of a single block are guaranteed to be executed on the same multiprocessor, thus, they can easily access data stored in the shared memory 234 of the multiprocessor. The programmer specifies both the number of blocks and number of threads per block to be created before a kernel is launched. These values are available to the kernel as gridDim and blockDim values, respectively.

Using CUDA 230 to accelerate the computation is easily exemplified on a vector summation problem. Suppose two vectors of length n to be summed. In the standard imperative programming language, a programmer would use a for loop to sum individual vector elements successively. Using CUDA 230, however, the vector elements can be summed concurrently in a single kernel call populated with n threads, each responsible for summation of a single pair of vector elements at the position given by the thread index.

III. Mapping to Massively Parallel Architectures

One of the advantages of the proposed 3D algorithm is that it can be mapped onto data parallel architectures such as modern graphics processing units (GPUs) as disclosed with respect to the system 100 or 200. In this section, we briefly describe the parallelism of each processing step of the proposed 3D algorithm, and the high level mapping onto the Nvidia CUDA architecture for GPU-based computing within the system 100 or 200.

The depth propagation, occlusion removal, and DCBF steps are purely parallel as each pixel in the desired view can be computed independently. Copying the depth values in the reference view to appropriate pixels in the target view is more complex from a parallelism perspective since, at some pixels, this is not a one-to-one mapping. This operation requires some form of synchronization to prevent concurrent writes to the same pixel, and can be accomplished with the use of atomic memory operations, or alternatively, with the use of Z-buffering hardware available on modern GPUs.

The disocclusion filling step in section I-B3 also has a sequential component since calculating unknown depth information is dependent on previously interpolated values. However, this dependence exists only on 1D lines emanating from the epipole, and thus the problem can be expressed as a parallel set of 1D filters. First, find the epipole position and categorize it into one of eight following subsets: top, bottom, left, right, top left, top right, bottom left, or bottom right, corresponding to eight sets of parallel lines every 45 degree angle. The parallel lines in each set need to pass through all pixels in the depth image. For each set of parallel lines, pixel coordinates of each line can be pre-computed and stored in a lookup table. The 1D DCBF is performed with each line proceeding in parallel, which can be easily mapped onto the GPU architecture.

The depth edge enhancement step described in Section I-B4 is a series of independent window-based operators (Sobel operators and window-based searches for the best match) and, hence, is naturally parallel. The final rendering step is quite similar to the first and second part of the algorithm except for the inclusion of a median filter. The median filter, however, is another window-based operator and, hence, is data parallel in nature.

TABLE I

COMPARISON IN THE RUNNING TIME OF THE DEPTH PROPAGATION, OCCLUSION REMOVAL, AND DCBF STEPS

| Mode | Frame rate (in fps) | Time (in msec) |
|---|---|---|
| Sequential | 0.0878 | 11,389 |
| Parallel | 24.37 | 41.03 |

In order to check the efficiency of the parallelism, the system 100 was configured to implement the depth propagation, occlusion removal, and DCBF steps in two modes: sequential mode and parallel mode. The experiment was run on the platform of Intel Core2 Duo E8400 3.0 GHz and an Nvidia GeForce 9800GT GPU with 112 processing cores. In sequential mode, the code was run only on the CPU, and in parallel mode, the code ran also on the GPU. The result in Table I shows that the parallel mode is about 277 times faster than the sequential mode. The speedup is mainly attributable to the higher degree of parallelism in parallel mode, and partly due to the increased efficiency brought about by the massive threading support of the GPGPU architecture. Note that the running time of the algorithm mainly depends on the image resolution, not on the complexity of the scene. Therefore, the obtained result can be approximated for other examples of the same resolution.

Regarding the parallel scalability of the proposed algorithm, experiments show that there is ample data parallelism to take advantage of the heavily-threaded 128-core modern GPU architecture. The proposed technique scales further with image size, and higher resolution images will create additional parallel work for future data parallel architectures that support yet higher degrees of parallelism. Furthermore, with the use of additional cameras, the data parallel computational load increases further yet, creating additional work that can be gainfully accelerated on future data parallel architectures. In the case of additional cameras, two approaches can be used. In one approach, the problem can be simplified into the case of using two nearest color cameras on the left and right with one nearest depth camera, and ignore other cameras. This approach is appropriate if the computational load is too high for real-time operation. In a second alternative, data from every camera can be used to improve rendering quality. Note that processing each color view—depth propagation, filling, and enhancement—is independent and suitable for parallelism.

IV. Experimental Results

For the experiments, we adopted a synthesis configuration with two color cameras and one depth camera. The color input images are shown in FIGS. 15(*a*), 15(*b*), and 15(*c*). For the high resolution depth case, the resolution is 800×600. The window size for occlusion removal step in Section I-A is 7×7. Parameters for the DCBF in Section I-B2 are set as following: $\sigma_s^2=3$, $\sigma_r^2=0.01$, and kernel window size=11×11. The enhanced propagated depth image of the left color view and the complete rendered image of a virtual view are shown in FIGS. 15(*e*) and 15(*g*). The black area at the bottom right of the rendered image is due to the fact that there is completely no information (both depth and color) from the input images corresponding to those areas.

For the low resolution depth case, the depth image is downsampled to the resolution of 160×120 (thus keeping only 4% of the depth information from the high resolution case). Some intermediate results are shown in FIG. 14. From the experimental results, we see that the proposed color-based depth filling and enhancement technique not only fills and preserves the depth edges but also corrects the depth edges (see FIGS. 14(*c*), 14(*d*), 14(*g*) and 14(*h*)). The enhanced propagated depth of the left color view and the complete rendered image shown in FIGS. 14(*f*) and 14(*h*) are almost the same as in the high resolution depth case. It can be noted that the information contained in a depth image is not as much as in a color image. So if a sufficiently sparse set of depth samples and true depth edges are given, the high resolution version of the depth image can be completely restored.

In the foregoing description, numerous specific details of programming, software modules, user selections, database queries, database structures, etc., are provided for a thorough understanding of various embodiments of the systems and methods disclosed herein. However, the disclosed system and methods can be practiced with other methods, components, materials, etc., or can be practiced without one or more of the specific details.

In some cases, well-known structures, materials, or operations are not shown or described in detail. Furthermore, the described features, structures, or characteristics may be combined in any suitable manner in one or more embodiments. The components of the embodiments as generally described and illustrated in the Figures herein could be arranged and designed in a wide variety of different configurations. The order of the steps or actions of the methods described in connection with the disclosed embodiments may be changed as would be apparent to those skilled in the art. Thus, any order appearing in the Figures, such as in flow charts or in the Detailed Description is for illustrative purposes only and is not meant to imply a required order.

Several aspects of the embodiments described are illustrated as software modules or components. As used herein, a software module or component may include any type of computer instruction or computer executable code located within a memory device and/or transmitted as electronic signals over a system bus or wired or wireless network. A software module may, for instance, include one or more physical or logical blocks of computer instructions, which may be organized as a routine, program, object, component, data structure, etc., that performs one or more tasks or implements particular abstract data types.

In certain embodiments, a particular software module may include disparate instructions stored in different locations of a memory device, which together implement the described functionality of the module. Indeed, a module may include a single instruction or many instructions, and it may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Various modifications, changes, and variations apparent to those of skill in the art may be made in the arrangement, operation, and details of the methods and systems disclosed. The embodiments may include various steps, which may be embodied in machine or computer-executable instructions to be executed by a general-purpose or special-purpose computer (or other electronic device). Alternatively, the steps may be performed by hardware components that contain specific logic for performing the steps, or by any combination of hardware, software, and/or firmware. Embodiments may also be provided as a computer program product including a machine or computer-readable medium having stored thereon instructions that may be used to program a computer (or other electronic device) to perform processes described herein. The machine-readable medium may include, but is not limited to, floppy diskettes, optical disks, CD-ROMs, DVD-ROMs, ROMs, RAMs, EPROMs, EEPROMs, magnetic or other type of media/machine-readable medium suitable for storing electronic instructions. For example, instructions for performing described processes may be transferred from a remote computer (e.g., a server) to a requesting computer (e.g., a client) by way of data signals embodied in a carrier wave or other propagation medium via a communication link (e.g., network connection).

The invention claimed is:

1. A method for executing depth image-based rendering of a 3D image from one or more color cameras and at least one depth camera by a computer having a processor and memory, the method comprising:

propagating, by the computer, depth information from the depth camera to an image plane of each color camera to produce a propagated depth image at each respective color camera, where propagating includes 3D warping with the depth camera considered as a first reference view and each color camera respectively being considered as a first target view, where the one or more color cameras and the at least one depth camera are positioned arbitrarily at different locations relative to a scene to be rendered;

enhancing, by the computer, the propagated depth image at each color camera with the color and propagated depth information thereof to produce corresponding enhanced depth images by executing the following processing techniques:
  detect occluded pixels in the propagated depth images;
  occlusion removal to replace values of the occluded pixels with newly interpolated values;
  depth-color bilateral filtering (DCBF) to combine color and propagated depth information to calculate values for unknown depth pixels in the propagated depth image while preserving edges of an object in the scene;
  directional disocclusion filling to fill areas of unknown depth pixels caused by the disocclusion in the propagated depth image, the filling direction originating from a plurality of epipoles related to each color camera; and
  depth edge enhancement to sharpen depth edges surrounding objects in the propagated depth images comprising:
    computing depth gradients in vertical, horizontal, and in at least one diagonal direction with Sobel operators;
    for each pixel P whose depth edge gradients are greater than a predetermined value, searching within a search window among the neighbor pixels for a best color-matched pixel that has a smallest Euclidean color distance with pixel P; and
    replacing the depth value of the pixel P by the depth value of the best color-matched pixel; and
  rendering, by the computer, a complete image viewable on a screen of the computer from one or more enhanced depth images from the one or more color cameras.

2. A method for rendering a 3D image from one or more color cameras and at least one depth camera by a computer having a processor and memory, the method comprising:
  propagating, by the computer, depth information from the at least one depth camera to an image plane of each color camera to produce a propagated depth image at each color camera;
  enhancing, by the computer, the propagated depth image at each color camera with the color and propagated depth information thereof to produce at least one enhanced depth image, by:
    computing a depth edge gradient for at least one pixel P;
    for each pixel P with a depth edge gradient greater than a predetermined value, searching within a search window among the neighbor pixels for a best color-matched pixel that has a smallest Euclidean color distance with pixel P;
    replacing the depth value of the pixel P by the depth value of the best color-matched pixel; and
  rendering, by the computer, a complete image viewable on a screen of the computer from one or more enhanced depth images from the one or more color cameras.

3. The method of claim 2, wherein the enhancing further comprises filling areas of unknown depth pixels in the propagated depth image, the filling direction originating from an epipole related to a camera pair comprising one color camera and one depth camera.

4. The method of claim 3, wherein the enhancing further comprises:
  selecting a pixel A;
  partitioning a support window around pixel A into a plurality of support windows; and
  replacing a depth value of pixel A by a newly interpolated value if in a majority of the support windows there is at least one pixel B such that the depth difference between pixels A and B is greater than a predetermined threshold value.

5. A system for rendering a 3D image from one or more color cameras and at least one depth camera, the system comprising:
  a computer coupled with the one or more color cameras and the at least one depth camera, the computer including a processor and memory, where the processor is programmed to:
    propagate depth information from the at least one depth camera to an image plane of each color camera to produce a propagated depth image at each color camera,
    enhance the propagated depth image at each color camera with the color and propagated depth information thereof to produce at least one enhanced depth image, the enhance comprising:
      compute a depth edge gradient for at least one pixel P;
      for each pixel P with a depth edge gradient greater than a predetermined value, search within a search window among the neighbor pixels for a best color-matched pixel that has a smallest Euclidean color distance with pixel P; and
      replace the depth value of the pixel P by the depth value of the best color-matched pixel; and
    render a complete image viewable on a screen of the computer from one or more enhanced depth images from the one or more color cameras.

6. The system of claim 5, wherein the enhance further comprises fill areas of unknown depth pixels in the propagated depth image, the fill direction originating from an epipole related to a camera pair comprising one color camera and one depth camera.

7. The method of claim 6, wherein the processor is further programmed to:
  select a pixel A;
  partition a support window around pixel A into a plurality of support windows; and
  replace a depth value of pixel A by a newly interpolated value if in a majority of the support windows there is at least one pixel B such that the depth difference between pixels A and B is greater than a predetermined threshold value.

* * * * *